US008820781B2

(12) United States Patent
Sato et al.

(10) Patent No.: US 8,820,781 B2
(45) Date of Patent: Sep. 2, 2014

(54) ATTACHMENT STRUCTURE FOR DRIVER SEAT AIRBAG DEVICE

(75) Inventors: Shinsuke Sato, Yokohama (JP); Masaru Narita, Yokohama (JP); Yasutaka Hiraoka, Yokohama (JP)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 13/819,145

(22) PCT Filed: Jul. 28, 2011

(86) PCT No.: PCT/JP2011/067233
§ 371 (c)(1),
(2), (4) Date: Feb. 26, 2013

(87) PCT Pub. No.: WO2012/026276
PCT Pub. Date: Mar. 1, 2012

(65) Prior Publication Data
US 2013/0154242 A1 Jun. 20, 2013

(30) Foreign Application Priority Data
Aug. 26, 2010 (JP) ................................ 2010-189902

(51) Int. Cl.
*B60R 21/203* (2006.01)
(52) U.S. Cl.
CPC ........... *B60R 21/203* (2013.01); *B60R 21/2037* (2013.01)
USPC ....................................................... 280/731
(58) Field of Classification Search
CPC ........................... B60R 21/203; B60R 21/2037
USPC ....................................................... 280/731
See application file for complete search history.

(56) References Cited

U.S. PATENT DOCUMENTS

| 5,678,850 A | * | 10/1997 | Ricks et al. | 280/728.2 |
| 5,765,860 A | * | 6/1998 | Osborn et al. | 280/728.2 |
| 5,782,481 A | * | 7/1998 | Magoteaux | 280/728.2 |
| 5,873,596 A | * | 2/1999 | Kantoh et al. | 280/728.2 |

(Continued)

FOREIGN PATENT DOCUMENTS

| DE | 19732022 A1 | * | 2/1998 | ............. B60R 21/20 |
| FR | 2743771 A1 | * | 7/1997 | |

(Continued)

OTHER PUBLICATIONS

International Search Report of PCT/JP2011/067233 Mailed Nov. 8, 2011, 4 pages.

*Primary Examiner* — Nicole Verley
(74) *Attorney, Agent, or Firm* — Brinks Gilson & Lione

(57) ABSTRACT

An attachment structure for driver seat airbag devices that enables smoother operation of a horn switch. The attachment structure includes: an armature connected to a steering mechanism of the vehicle; and a housing that accommodates the airbag module and that is positioned with respect to the armature. The housing includes positioning pins for implementing relative positioning in XY directions with respect to the armature at a plurality of locations and first openings for implementing positioning in a Z direction at a plurality of locations. The armature is provided with a plurality of second openings through which the positioning pins of the housing are inserted and with a plurality of protrusions that are inserted through the first openings of the housing. The position of Z-direction lower edge sections of the first openings of the housing lies within a range of the depth of the second openings of the armature.

7 Claims, 9 Drawing Sheets

(56) References Cited

U.S. PATENT DOCUMENTS

| | | | |
|---|---|---|---|
| 6,199,908 B1* | 3/2001 | Isomura et al. | 280/777 |
| 6,592,141 B1* | 7/2003 | Dancasius et al. | 280/728.2 |
| 6,639,160 B2* | 10/2003 | Ibe et al. | 200/61.54 |
| 6,675,675 B1* | 1/2004 | Sauer et al. | 74/552 |
| 6,953,204 B2* | 10/2005 | Xu et al. | 280/731 |
| 7,387,312 B2* | 6/2008 | Amamori | 280/731 |
| 7,592,557 B2* | 9/2009 | Cortina et al. | 200/61.54 |
| 7,976,059 B2* | 7/2011 | Fujita et al. | 280/731 |
| 8,342,567 B2* | 1/2013 | Sasaki et al. | 280/728.2 |
| 8,556,292 B2* | 10/2013 | Umemura et al. | 280/731 |
| 2002/0079678 A1* | 6/2002 | Kai et al. | 280/731 |
| 2006/0028002 A1* | 2/2006 | Tsujimoto et al. | 280/731 |
| 2008/0100040 A1* | 5/2008 | DePottey et al. | 280/728.2 |
| 2010/0219621 A1* | 9/2010 | Sasaki et al. | 280/731 |
| 2012/0292895 A1* | 11/2012 | Schutz | 280/731 |
| 2013/0026741 A1* | 1/2013 | Onohara | 280/731 |

FOREIGN PATENT DOCUMENTS

| | | |
|---|---|---|
| JP | 03-079471 | 4/1991 |
| JP | 2001-354101 | 12/2001 |
| JP | 2003-501307 | 1/2003 |
| JP | 2004-322931 | 11/2004 |

* cited by examiner

ATTACHMENT STRUCTURE FOR DRIVER SEAT AIRBAG DEVICE

BACKGROUND

1. Field of the Invention

The present invention relates to an attachment structure for driver seat airbag devices. More particularly, the present invention relates to positioning/connection portions between an armature and a housing that accommodates an airbag.

2. Related Technology

Airbag devices include various types of devices, for instance, driver seat airbag devices that are accommodated inside the steering wheel, so-called curtain airbag devices that are disposed along the upper edge of a window frame, and airbag devices for a front passenger seat, which are disposed inside an instrument panel.

A driver seat airbag device has a structure wherein an airbag module comprising an airbag and an inflator are accommodated in a housing and are positioned with respect to, and connected to, an armature. The outer side of the housing (vehicle interior side) is covered by a steering cover. To position the housing and the armature, and to restrict excessive displacement thereof, openings are provided in one of the foregoing and pins or protrusions are provided in the other, such that the pins or protrusions are inserted in the openings.

When the steering cover is pressed from above during the operation of a horn switch, the pressing action bears simultaneously also on the housing that accommodates the airbag. In conventional driver seat airbag devices, the operation of the horn switch resulted, in some instances, in the occurrence of backlash between the housing and the armature. A smooth and stable operation failed thus to be achieved.

SUMMARY

In the light of the above problems, it is an object of the present invention to provide an attachment structure for driver seat airbag devices that enables a smoother operation of a horn switch.

In order to solve the above problems, in one aspect the present invention provides an attachment structure of an airbag module for attaching an airbag module to a steering wheel of a vehicle, the attachment structure including: an armature connected to a steering mechanism of the vehicle; and a housing that accommodates the airbag module and that is positioned with respect to the armature. The housing is provided with positioning pins for implementing relative positioning in X and Y directions with respect to the armature at a plurality of locations, and also provided with first openings for implementing positioning in a Z direction at a plurality of locations. The armature is provided with a plurality of second openings through which the positioning pins of the housing are inserted, and provided with a plurality of protrusions that are inserted through the first openings of the housing. The position of Z-direction lower edge sections of the first openings of the housing lies within the range of the depth of the second openings of the armature.

The attachment structure embodying the principles of the present invention thus allows keeping to a minimum interference of positioning pins within the second openings, which arises when the steering cover is pressed accompanying the operation of the horn switch. In turn, this has the effect of stabilizing the horn actuating force.

DETAILED DESCRIPTION

Figure 1:
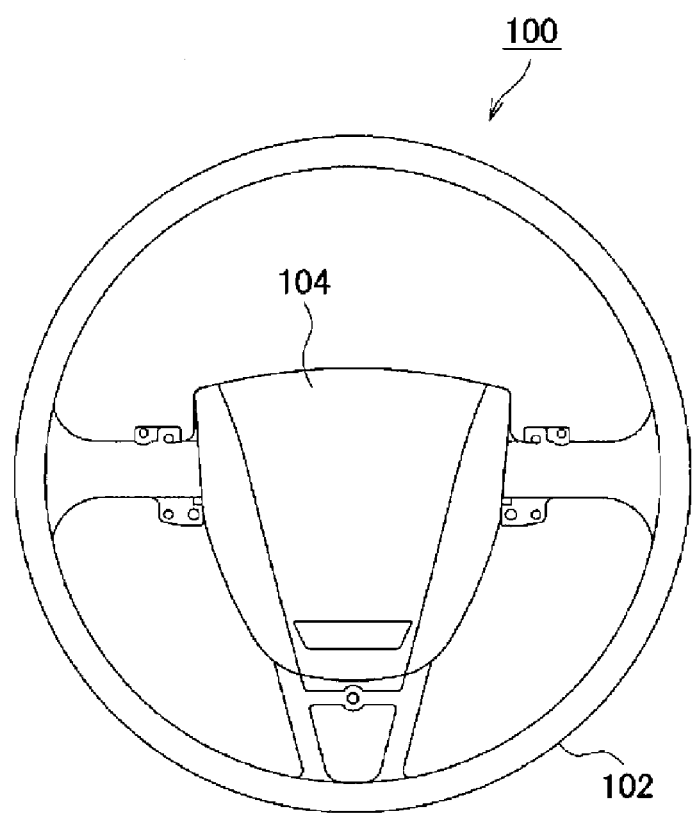
FIG. 1 is a plan-view diagram illustrating a steering wheel incorporating an attachment structure for driver seat airbag devices according to the principles of the present invention.

A detailed explanation follows on an attachment structure for driver seat airbag devices according to the present invention, with reference to FIG. 1 to FIG. 6. As illustrated in FIG. 1, a steering wheel 100 comprises a ring-like handle section 102 and a steering cover 104 that is disposed in the middle of the handle section 102 and that covers an airbag module 105.

An attachment structure for attaching an airbag module 105 to the steering wheel (100) of the vehicle comprises an armature 116 (FIG. 4) connected to a steering mechanism (not shown) of the vehicle, such as a rack-and-pinion mechanism, and a housing 108 that accommodates the airbag module 105 and that is positioned with respect to the armature 116. The armature 116 can be formed by magnesium die-casting and the housing 108 can be molded out of plastic.

Positioning pins 110a, 110b, 110c for positioning in the XY directions relative to the armature 116 are provided at three locations in the housing 108. Openings 118a, 118b, 118c shaped as long holes, and through which the positioning pins 110a, 110b, 110c are inserted, are correspondingly provided in the armature 116. The openings 118a, 118b, 118c are designed so as to be larger, by some allowance, than the diameter of the positioning pins 110a, 110b, 110c.

Rectangular openings 112a, 112b, 112c for positioning in the Z direction are further provided in the housing 108. Protrusions 120a, 120b, 120c (FIG. 4) are inserted through the openings 112a, 112b, 112c of the housing and are correspondingly provided in the armature 116. The openings 112a, 112b, 112c are designed with greater allowance in the Z direction (perpendicular direction) than the protrusions 120a, 120b, 120c. The housing 108 is prevented thus from coming off on account of the momentum of the deploying airbag.

Herein, the "XY directions" do not denote the horizontal, but a plane parallel to the steering wheel. The "Z direction" denotes a direction perpendicular to the plane of the XY directions.

Figure 2:
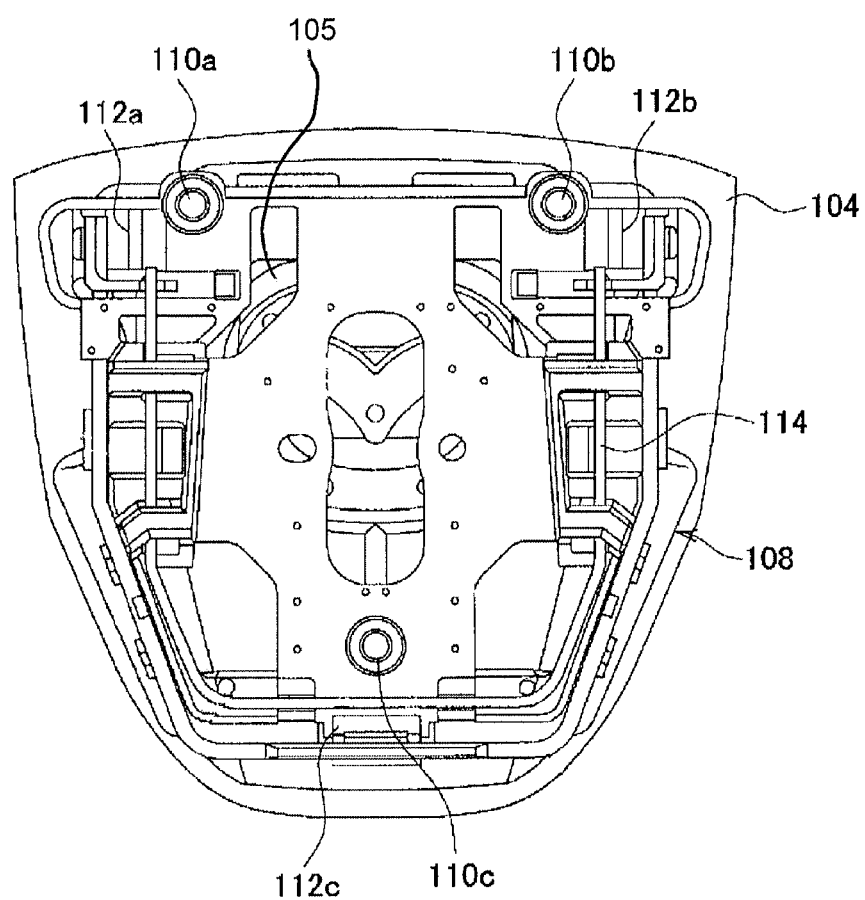
FIG. 2 is a plan-view diagram (rear-view diagram) illustrating an attachment structure for driver seat airbag devices according to the principles of the present invention, wherein the diagram illustrates the structure of an airbag housing that is attached to a steering cover.
Figure 3:
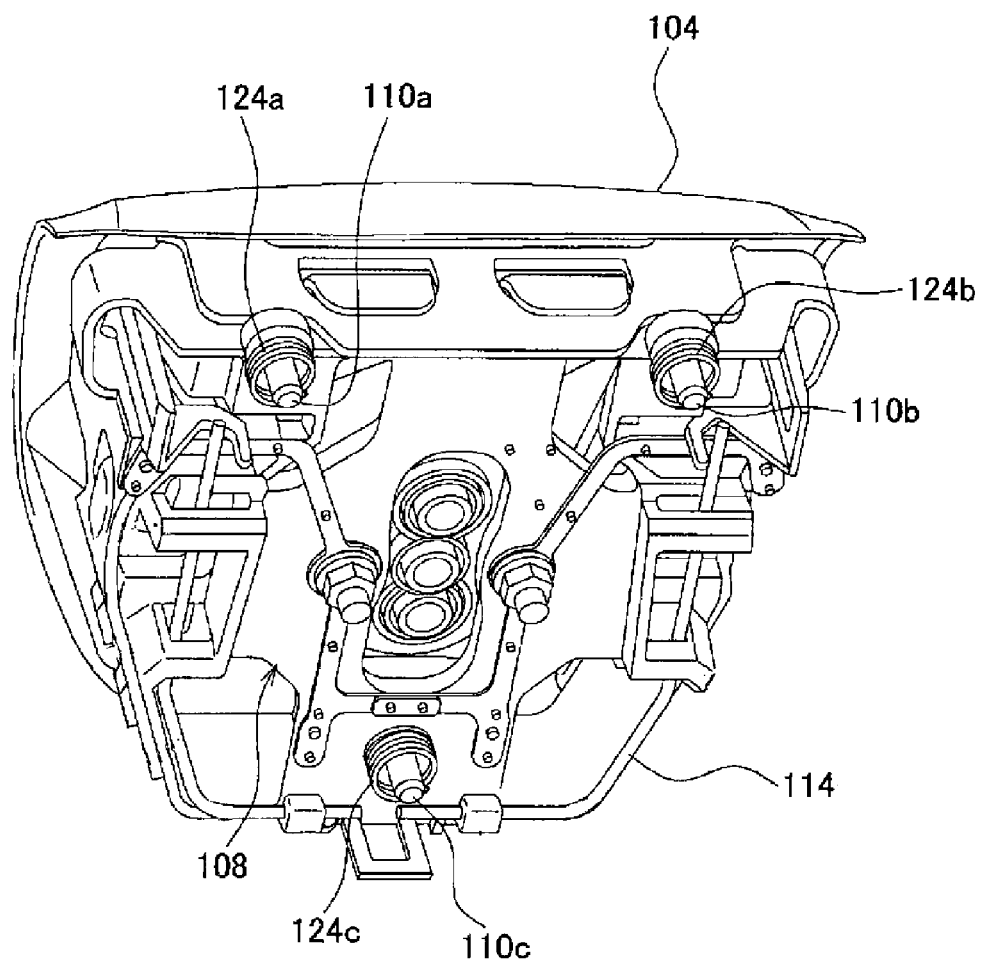
FIG. 3 is a perspective-view diagram (rear-view diagram) illustrating an attachment structure for driver seat airbag devices according to the principles of the present invention, wherein the diagram illustrates the structure of an airbag housing that is attached to a steering cover.
Figure 4:
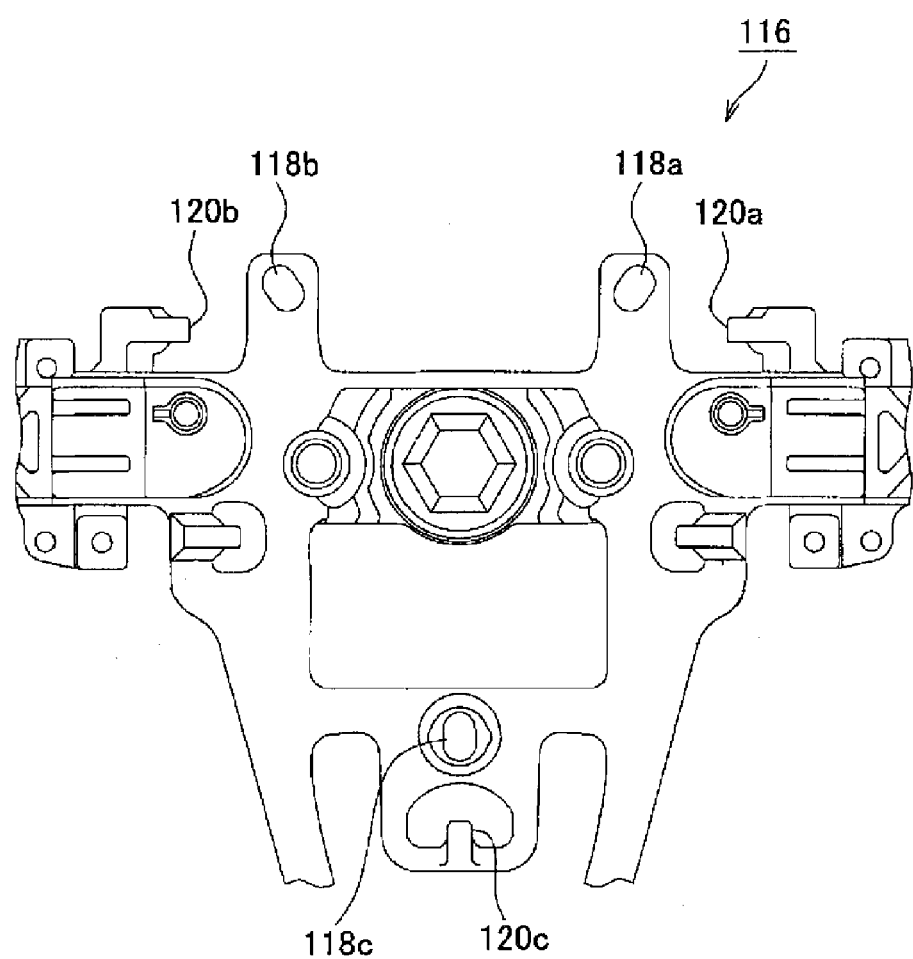
FIG. 4 is a plan-view diagram illustrating an attachment structure for driver seat airbag devices according to the principles of the present invention, wherein the diagram illustrates the structure of an armature.
Figure 5:
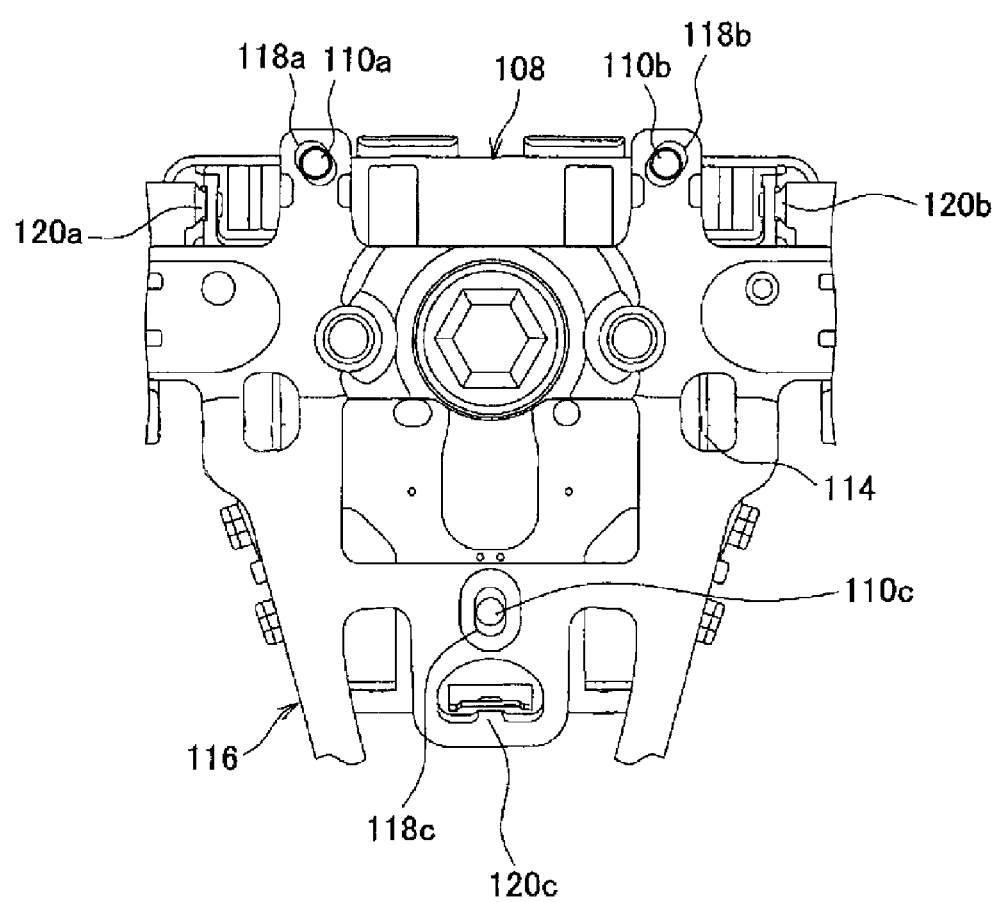
FIG. 5 is a plan-view diagram (rear-view diagram) illustrating an attachment structure for driver seat airbag devices according to the principles of the present invention, wherein the diagram illustrates the structure of an armature and an airbag housing attached to a steering cover.

As illustrated in FIG. 2 and FIG. 3, a rod-like spring 114 known as an omega ring is attached to the housing 108, such that the armature 116 is locked to the spring 114.

Figure 6:
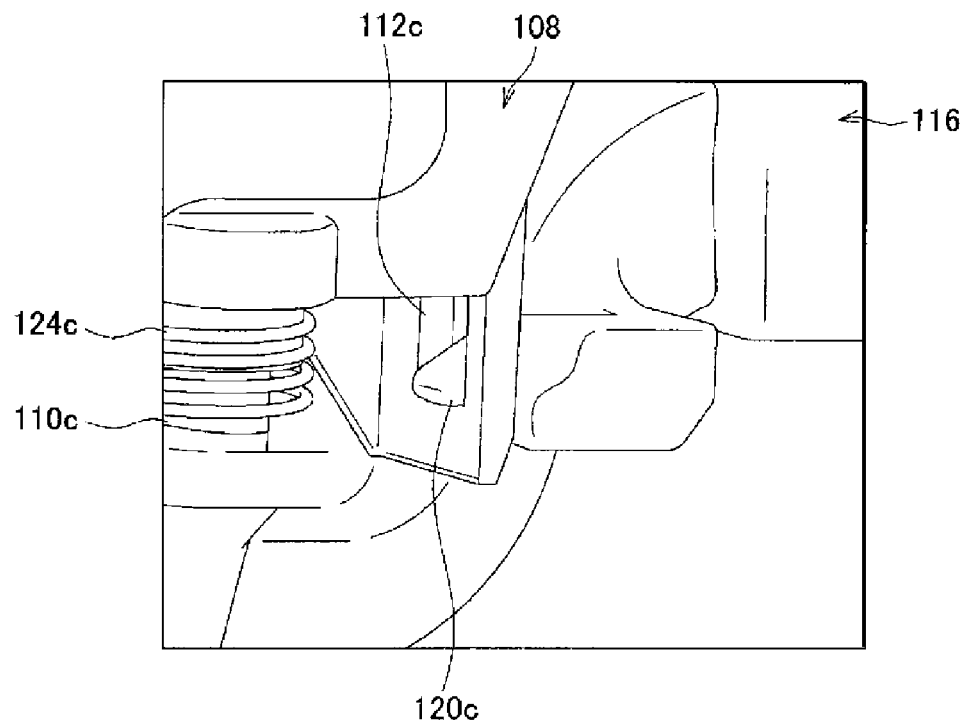
FIG. 6 is a perspective-view diagram illustrating an attachment structure for driver seat airbag devices according to the principles of the present invention, wherein the diagram illustrates an enlargement of a positioning structure portion.

As illustrated in FIG. 3 and FIG. 6, respective springs 124a, 124b, 124c are disposed on the periphery (outward of) the positioning pins 110a, 110b, 110c, in the housing 108. The springs 124a, 124b, 124c exert a return force against a pressing force upon operation of the horn switch. As illustrated in FIG. 6, the protrusions 120a, 120b, 120c come into contact with Z-direction lower edge sections of the openings 112a, 112b, 112c.

Figure 7:
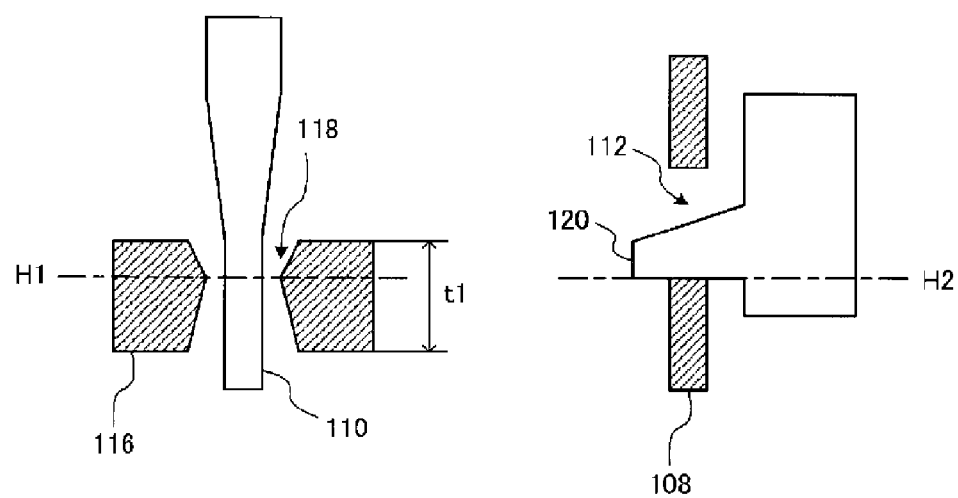
FIG. 7 is an explanatory diagram illustrating a feature of the driver seat airbag device according to the principles of the present invention.

FIG. 7 is an explanatory diagram illustrating a feature of the driver seat airbag device according to the present invention. As illustrated in FIG. 7, a feature of the present invention is that a position H2 of the Z-direction lower edge sections of the openings 112 (112a, 112b, 112c) of the housing 108 lies within the range of a depth t1 of the openings 118 (118a, 118b, 118c) of the armature 116. In FIG. 7, a position H1 of a narrowest section of the openings 118 in the perpendicular direction matches substantially the position H2 of the Z-direction lower edge sections of the openings 112, but the positions need not necessarily be coincident.

Figure 8:
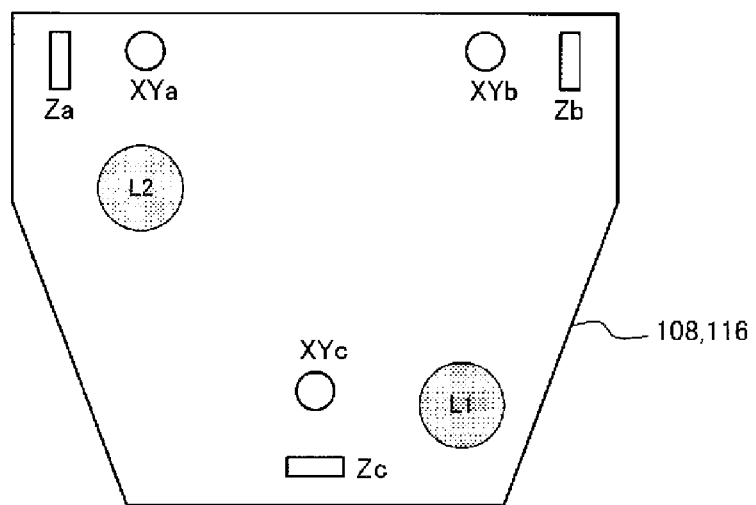
FIG. 8 is a schematic diagram used for explaining a feature of the driver seat airbag device according to the principles of the present invention.
Figure 9:
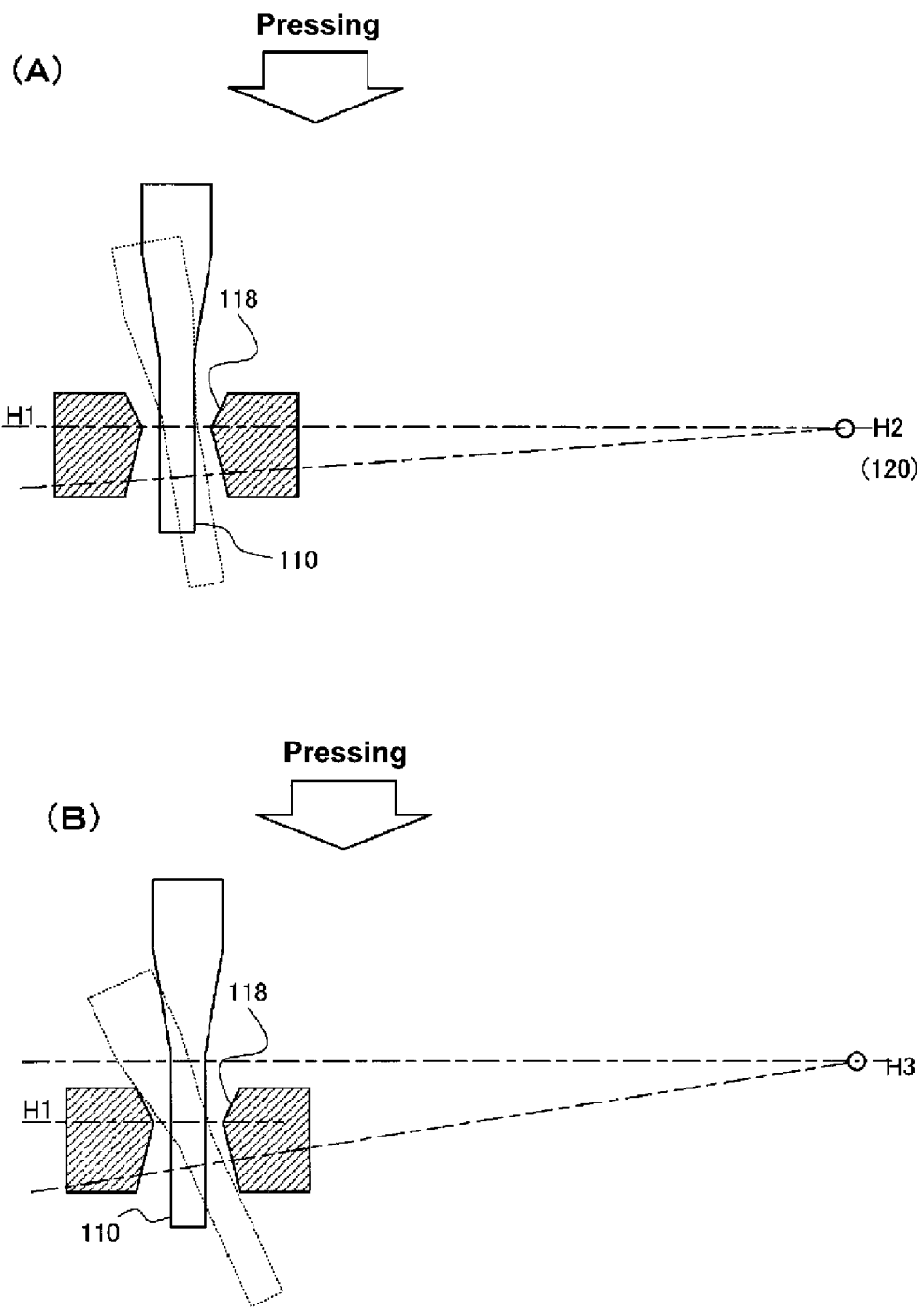
FIG. 9(A) and FIG. 9(B) area set of explanatory diagrams for explaining the action of the driver seat airbag device according to the principles of the present invention, wherein FIG. 9(A) corresponds to the present invention and FIG. 9(B) corresponds to a comparative example.

FIG. 8 is a schematic diagram illustrating a feature of the driver seat airbag device according to the present invention. FIG. 9 is a set of explanatory diagrams for explaining the action of the driver seat airbag device according to the present invention, wherein FIG. 9(A) corresponds to the present invention and FIG. 9(B) corresponds to a comparative example. As illustrated in FIG. 8, a positioning pin (XYc) bends obliquely, mainly with an opening Za as a fulcrum, in a case where the vicinity of a point L1 on the steering cover 14 is pressed. A positioning pin (XYa) bends obliquely, mainly with openings Zb, Zc as fulcrums, in a case where the vicinity of a point L2 is pressed.

When levels H1 and H2 stand substantially at the same height, the tilt of the positioning pins 110 (110a, 110b, 110c) having the level H2 as a fulcrum is necessarily small, and the positioning pins 110 have still some allowance in the openings 118 (118a, 118b, 118c), as illustrated in FIG. 9(A). By contrast, when the level H3 is significantly spaced apart from the level H1 of the narrowest section of the openings 118, the tilt of the positioning pins 110 having H3 as a fulcrum is necessarily large, and the positioning pins 110 interfere readily with the inner wall of the openings 118, as illustrated in FIG. 9(B).

In the above-described example, the positioning pins are provided at three sites so as to form the vertices of a triangle, but the positioning pins are not limited to such a configuration.

Working examples of the present invention have been explained above, but the present invention is not limited to the above-described working examples, and may accommodate various design variations without departing from the technical idea set forth in the appended claims.

The invention claimed is:

1. An attachment structure of an airbag module for attaching an airbag module to a steering wheel of a vehicle, the attachment structure comprising:
    an armature configured to be connected to a steering mechanism of the vehicle; and
    a housing configured to accommodate the airbag module and being positioned with respect to the armature, wherein
    the housing having positioning pins for implementing relative positioning in X and Y directions with respect to the armature at a plurality of locations, and the housing having portions defining first openings for implementing positioning in a Z direction at a plurality of locations,
    the armature being provided with a plurality of second openings through which the positioning pins of the housing are inserted, the second openings varying in width over their length and the armature being provided with a plurality of protrusions that are inserted through the first openings of the housing, and
    the position of a Z-direction lower edge of the first openings of the housing lying at the same depth in the Z direction as a narrowest width of the second openings of the armature.

2. The attachment structure of claim 1, wherein the positioning pins are provided at three sites so as to form vertices of a triangle, the second openings are provided at three sites generally corresponding to the three sites of the positioning pins, the first openings are provided at three sites so as to form vertices of a triangle and the first openings being located radially outward of the three sites of the positioning pins, and the protrusions are provided at three sites generally corresponding to the three sites of the first openings.

3. The attachment structure of claim 2, wherein inside the first openings the protrusions are in contact with the Z-direction lower edge.

4. The attachment structure of claim 3, wherein springs are provided around the positioning pins, the springs imparting an elastic force that urges the housing to return upward when pressed down on account of a pressing operation of a vehicle interior-side cover that covers the housing.

5. The attachment structure of claim 2, wherein springs are provided around the positioning pins, the springs imparting an elastic force that urges the housing to return upward when pressed down on account of a pressing operation of a vehicle interior-side cover that covers the housing.

6. The attachment structure of claim 2, wherein inside the first openings the protrusions are in contact with the Z-direction lower edge.

7. The attachment structure of claim 1, wherein springs are provided around the positioning pins, the springs imparting an elastic force that urges the housing to return upward when pressed down on account of a pressing operation of a vehicle interior-side cover that covers the housing.

* * * * *